United States Patent [19]

Blake

[11] 4,360,211
[45] Nov. 23, 1982

[54] DOLLY APPARATUS

[75] Inventor: Richard E. Blake, Indianapolis, Ind.

[73] Assignee: Perry Manufacturing, Inc., Indianapolis, Ind.

[21] Appl. No.: 183,245

[22] Filed: Sep. 2, 1980

[51] Int. Cl.³ .............................................. B62B 3/02
[52] U.S. Cl. .................................. 280/79.3; 211/189
[58] Field of Search ............... 280/79.3, 79.2, 79.1 A, 280/47.34, 47.35, 47.18; 211/182, 189, 50, 206, 204; 182/179, 121, 111, 119

[56] References Cited

U.S. PATENT DOCUMENTS

| 2,253,764 | 8/1941 | Condon | 280/79.3 |
| 2,514,308 | 7/1950 | Burg | 280/79.3 |
| 2,945,699 | 7/1960 | Berlye | 280/79.3 |
| 3,396,817 | 8/1968 | Perry | 182/179 |

FOREIGN PATENT DOCUMENTS

| 310381 | 12/1955 | Switzerland | 280/79.3 |
| 354400 | 6/1961 | Switzerland | 280/79.3 |

Primary Examiner—David M. Mitchell
Attorney, Agent, or Firm—Woodard, Weikart, Emhardt & Naughton

[57] ABSTRACT

A knock-down dolly apparatus is disclosed herein which includes a pair of end frames interconnected with three removable trusses and having wheels mounted to the bottom of the end frames. The dolly apparatus further includes a platform which in combination with the configuration of the end frame yields rearwardly-inclined bottom and back support surfaces for maintaining sheet material on the dolly in a stable configuration.

10 Claims, 4 Drawing Figures

DOLLY APPARATUS

BACKGROUND OF THE INVENTION

1. Field of the Invention

The present invention relates to the field of dolly devices, and particularly to a dolly apparatus which may be knocked down to several components.

2. Description of the Prior Art

The provision of a dolly apparatus for various uses is well known in the art. One particular application of such a dolly is the use in supporting and transporting large sheet material such as plywood or drywall. In the usual construction of such dollys, the apparatus is comprised of a rigid, integral structure which includes a horizontal floor mounted to wheels, and a rearwardly-slanted back wall to permit the sheet material to be leaned backwardly against the wall. Examples of typical material-handling dollys or carts are disclosed in U.S. Pat. Nos. 2,466,149, issued to Burg on Apr. 5, 1949; 2,514,308, issued to Burg on July 4, 1950; and 3,669,464, issued to Linzmeier on June 13, 1972. Related devices are also shown in U.S. Pat. Nos. 2,447,028, issued to Riddick on Aug. 17, 1948, and 4,022,413, issued to Isaacs on May 10, 1977.

In U.S. Pat. No. 2,936,849, issued to Larsen on May 17, 1960, there is disclosed a ladder leveling device using spring-biased pins received in any of several holes to provide the desired leveling of the platform. An adjustable scaffold comprising end frames connected by trusses, which trusses include spring-biased pins received in holes in the end frames, is disclosed in U.S. Pat. No. 3,396,817, issued to Perry on Aug. 13, 1968. A portable scaffold is disclosed in U.S. Pat. No. 2,585,768, issued to Gasner et al. on Feb. 12, 1952.

In contrast to the various dolly devices of the prior art, the present invention provides a dolly which may be knocked down to its several components, and particularly which includes separate end frames interconnected by several trusses. The trusses are readily installed upon the end frames to provide for quick assembly, and also the trusses and platform could be used for other purposes, thus making the present device more versatile than those of the prior art.

SUMMARY OF THE INVENTION

Briefly described in one aspect of the present invention, there is provided a knock-down dolly apparatus including a pair of end frames which are interconnected by three trusses, one being rearwardly slanted and extending between a rear supporting portion and the others extending between a bottom supporting portion. A platform is mounted to the dolly and is inclined rearwardly.

It is an object of the present invention to provide a dolly apparatus which is simple and durable in construction, and which is capable of supporting and carrying a substantial amount of weight.

It is a further object of the present invention to provide a dolly apparatus which is particularly adapted for carrying sheet material.

Another object of the present invention is to provide a dolly apparatus which may be knocked down to its several components.

It is another object of the present invention to provide a dolly apparatus which includes separate components which may be adapted for use in other manners.

A further object of the present invention is to provide a knock-down dolly apparatus which may be quickly and easily assembled from its several components, and particularly may be assembled by one person.

Further objects and advantages of the present invention will become apparent from the description of the preferred embodiment which follows.

DESCRIPTION OF THE PREFERRED EMBODIMENT

Figure 1:
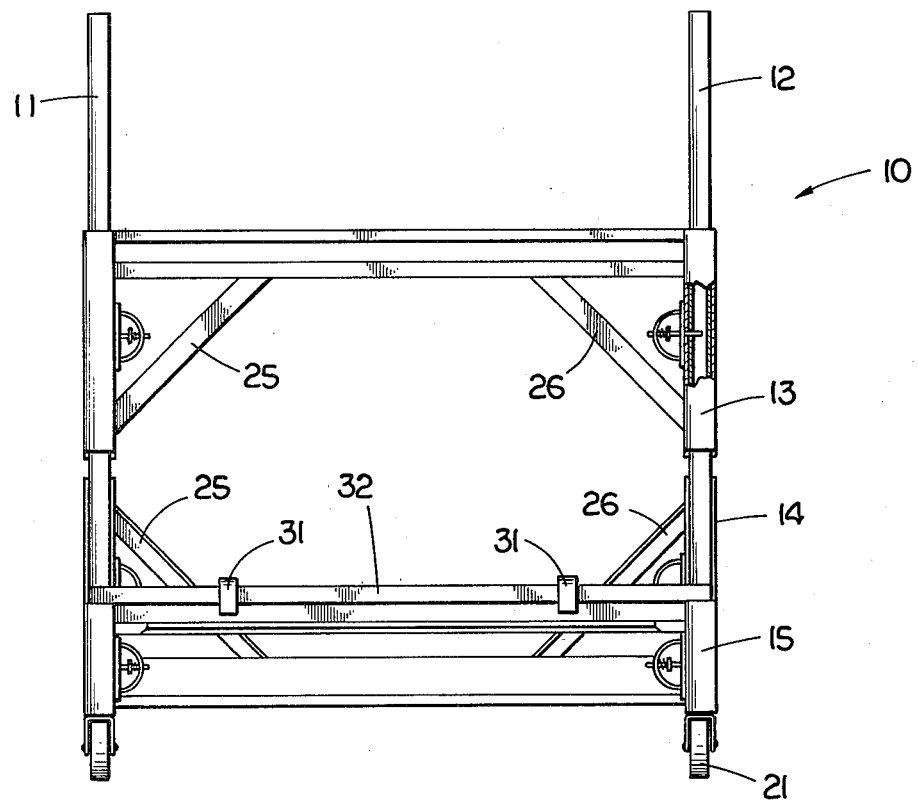
FIG. 1 is a front, elevational view of a dolly apparatus constructed in accordance with the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The dolly apparatus of the present invention provides a device which may be knocked down into several components, which components may be adapted for use in other manners. The dolly apparatus is readily assembly from its components, and provides a dolly which is particularly adapted for use in supporting and moving sheet-like material. A particular feature of the present invention is the provision of a rearwardly-slanted platform coupled with a rearwardly-slanted rear support, together defining a 90° angle which facilitates the supporting of the sheet material.

Referring in particular to the drawings, there is shown a dolly apparatus 10 constructed in accordance with the present invention. Apparatus 10 includes a pair of end frames 11 and 12 interconnected by preferably three trusses 13–15.

Each of the end frames are identical, and therefore only the end frame 12 will be described in detail. End frame 12 includes a base support member 16 connected with a rear support brace 17. A bottom support brace 18 is mounted to the opposite end of the base support member 16. A rearwardly-slanted bottom support member 19 extends between and connects with the bottom support brace 18 and the rear support brace 17, although it could alternatively attach to the base support member 16. A rearwardly-slanted rear support member 20 is connected at one end with the rear support brace 17 and at the other end is connected to the bottom support member 19, although alternatively it may be attached to the base support member 16. The various components of the end frames, as for the other components of the dolly apparatus of the present invention, are interconnected by suitable means, preferably by welding.

Wheel means are connected with each of the end frames to permit the end frames to roll along a support surface. Most suitably, the wheel means comprises several caster wheel assemblies 21 secured to the end frames, preferably being attached to the bottom and rear support braces 18 and 17, respectively. It will be appreciated that other types of wheels, and wheel combinations, may suitably be used with the present apparatus. For example, it may be desirable that only two of the wheels comprise caster wheels whereas the opposite two wheels would be coaxially aligned, typically with the axis being parallel with the end frame to which the wheels are mounted.

Figure 3:
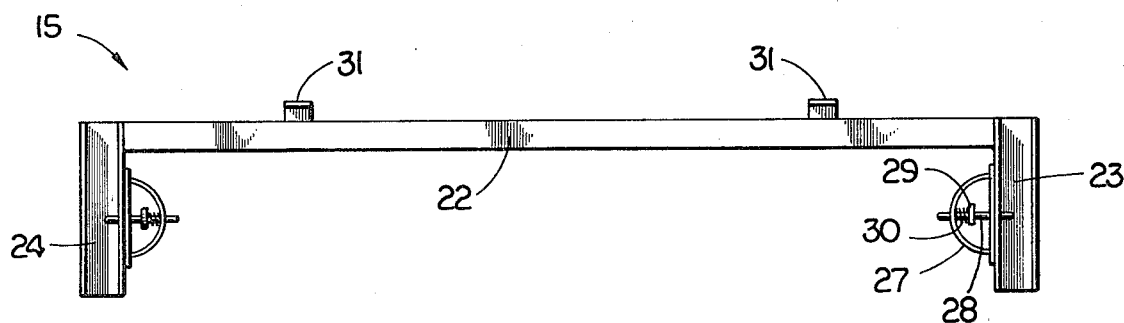
FIG. 3 is a rear, elevational view of a truss used in the preferred embodiment of the present invention.
Figure 4:
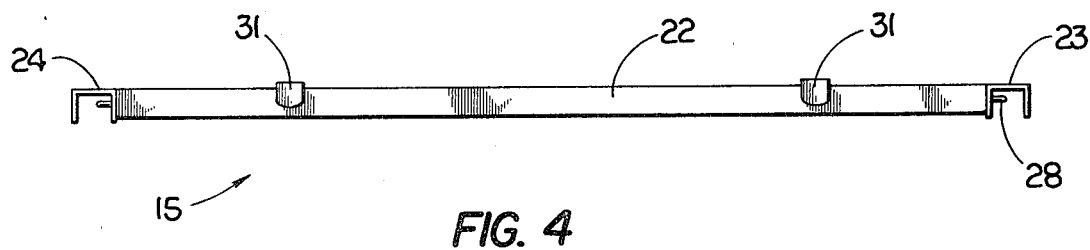
FIG. 4 is top, plan view of the truss of FIG. 3.

The end frames are interconnected with two or more trusses, such as those shown in the figures as trusses 13–15. These trusses preferably are substantially identical to those shown in U.S. Pat. No. 3,396,817, issued to Perry on Aug. 13, 1968, the pertinent portions of which are hereby incorporated by reference. Referring in particular to FIGS. 3 and 4, each of the trusses preferably includes a cross member 22 to which is secured the end channel members 23 and 24. For the trusses mounted to the rear support member and rear support brace, it is preferable that braces, such as 25 and 26 (FIG. 1), are included for additional strength.

The end, channel members are generally C-shaped and define channels within which the respective portions of the end frames are received. For each of these channel members, there is provided a D-shaped ring 27 which includes a pin 28 extending therethrough and through the channel members into the interior of the channels. A stop 29 is provided on the pin and a compression spring 30 is received over the pin between the stop 29 and the outward portion of the D-ring 27 to urge the pin in the direction of the channel member. The correlating portions of the end frames define apertures through which the pins 28 may be received. In this manner, the forcing of the pin 28 out of the channel in the respective channel member is facilitated by use of the D-ring and stop and in that condition the truss may be inserted over the end frames with the pins released to be received within the holes in the end frames.

The truss 15 is provided with a pair of L-shaped retaining members 31 define slots positioned to receive the platform 32 therein. The retaining members 31, in combination with the rear support member 20, firmly engage and hold the platform 32 in the position shown.

In this manner, a dolly apparatus is provided which may be knocked down into several components. In the preferred embodiment, the dolly may be disassembled into a pair of end frames, three trusses, and the platform. In this manner, the dolly apparatus may be easily transported from one location to another at a job site, and also from one job site to another.

It is particularly advantageous that the bottom support member 19 and the rear support member 20 are both rearwardly inclined, such that a 90° angle is defined therebetween. The sheet material placed on edge indirectly on the bottom support member, or more directly on the platform 32, is rested against the rear support member 20 and due to the inclines of both of these members will be prevented from falling off of the cart.

As a further feature of the present invention, the dolly apparatus includes components which are readily adapted for use in other manners. For example, the cited Perry patent utilizes trusses which are substantially identical to the trusses 13 and 14 of the present invention. Also, the caster wheels such as 21 are fairly typical components, and may for example be found on a portable scaffold such as that shown in the Perry patent. In order to construct the dolly apparatus of the present invention, therefore, it is possible to require only an additional pair of end frames and truss.

Figure 2:
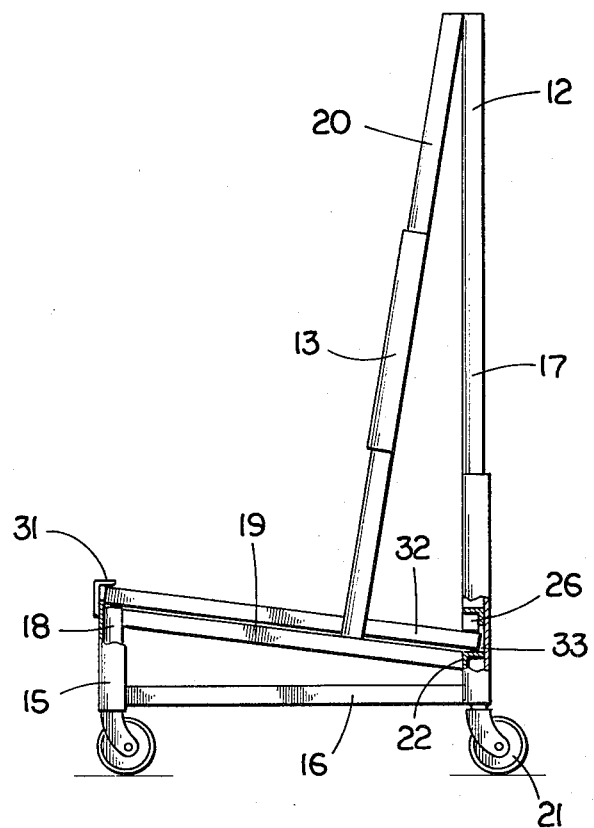
FIG. 2 is a side, elevational view of the dolly apparatus of FIG. 1.

A procedure for converting a scaffold, such as that shown in the Perry patent, to the dolly apparatus of the present invention will be provided by way of example. Assuming that the end frames 11 and 12, and truss 15, are provided, only a few additional parts are necessary. The casters from the scaffold of the Perry patent may be inserted into the end frames, and the lock brakes are engaged to make the assembly easier. One of the trusses from the scaffold of the Perry patent is attached in an inverted position to the rear support brace 17 of both of the end frames using the holes provided. The truss 15 is attached to the bottom support brace 18 of one of the end frames. The platform 32 is then inserted into its proper position and held within the retaining members 31 and within slots 33 (FIG. 2) defined by the braces 25 and 26 of the truss 14. The truss 15 is attached at the other end to the other end frame. The remaining truss is then applied in similar fashion. As disclosed in the cited Perry patent, the stops 29 may have internally threaded portions which are receivable over externally threaded portions of the D-ring to lock the pins in the extended position holding the trusses to the end frames. As described, the dolly apparatus of the present invention provides a knock-down device which is quickly and easily assembled by only one person.

It will be appreciated that variations in the preferred embodiment may be made without departing from the scope and contemplation of the present invention. For example, the dolly apparatus may be constructed with only a pair of trusses such as 13 and 15, but a less stable dolly is thereby obtained. In this regard, it will also be appreciated that the trusses may to a certain extent be attached to different members of the end frames. For example, in the case of only two trusses, one of the trusses may be attached to either the rear support braces 17 or the rear support members 20, provided that accommodations are made to give the support for the sheet material. Similarly, the truss 15 could be mounted between any of the bottom support members 19, the bottom support braces 18 and the base support members 16. It is also apparent that the dolly apparatus may be converted for use with different types of materials, and particularly may be easily adapted to have different lengths simply by the use of different length trusses. The rearwardly-angled rear support members 20 and bottom support members 19 are particularly desirable in that the resulting angles cause the sheet material to be carried in a stable position centered over the dolly apparatus. The connecting means, comprising in the preferred embodiment the D-rings 27 and associated components, may also assume different configurations. However, it is particularly desirable to have a connecting means which is easily manipulated to facilitate the assembly of the apparatus by one person. The D-ring and components are advantageous in that the curved portion of the D-ring provides a leverage point to be used in pulling the pins out of the holes in the end frames during assembly or disassembly. Similarly, the provision of the stops 29 give a leverage point for use in manipulating the pins against the springs 30.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A knock-down dolly apparatus which comprises:

first and second end frames, each of said end frames including an upwardly and rearwardly-slanted rear support member, a downwardly and rearwardly-slanted bottom support member, a generally horizontal base support member, a generally vertical rear support brace connected with the rear support member and the base support member, and a bottom support brace connected with the bottom support member and the base support member, the bottom support member also being connected with one of the rear support brace and the base support member, the rear support member also being connected with one of the bottom support member and the base support member;

wheel means connected with each of said end frames for permitting rolling of said end frames along a support surface;

a first truss;

first connection means for providing a ready connection, disconnection and reconnection of said first truss between one of the rear support member and rear support brace of each of said end frames;

a second truss;

second connection means for providing a ready connection, disconnection and reconnection of said second truss between one of the bottom suport member, base support member, and bottom support brace of each of said end frames;

a platform received adjacent the bottom support members and being rearwardly-slanted; and retaining means for retaining said platform adjacent the bottom support member.

2. The apparatus of claim 1 in which said first connection means is for connecting said first truss between the rear support member of each of said end frames, said apparatus further including a third truss and third connection means for providing a ready connection, disconnection and reconnection of said third truss between the rear support brace of each of said end frames.

3. The apparatus of claim 2 in which said wheel means comprises caster wheels.

4. The apparatus of claim 2 in which said retaining means includes slots in said second truss within which said platform is received.

5. The apparatus of claim 2 in which said rear support braces extend vertically to about the top of the rear support members of said end frames.

6. The apparatus of claim 2 in which each of said trusses includes spring biased pins received within complementary holes in each of said end frames.

7. The apparatus of claim 6 in which each of the pins of said trusses extends through a corresponding aperture in said truss, and in which each of said trusses includes a D-shaped portion associated with each of the spring biased pins and enclosing a portion of each of the pins.

8. The apparatus of claim 7 in which said rear support braces extend vertically to about the top of the rear support members of said end frames.

9. The apparatus of claim 7 in which said retaining means includes slots in said first truss within which said platform is received.

10. The apparatus of claim 9 in which said rear support braces extend vertically to about the top of the rear support members of said end frames.

* * * * *